United States Patent [19]

Prucnal

[11] 4,048,036

[45] Sept. 13, 1977

[54] PROCESS FOR PRODUCING FILMS OF LOW GLOSS BY EXPOSURE TO ULTRAVIOLET LIGHT

[75] Inventor: Paul J. Prucnal, Monroeville, Pa.

[73] Assignee: PPG Industries, Inc., Pittsburgh, Pa.

[21] Appl. No.: 517,669

[22] Filed: Oct. 24, 1974

[51] Int. Cl.² ............................. C08F 2/46; C08F 4/00
[52] U.S. Cl. ............................ 204/159.23; 204/159.14; 204/159.18; 204/159.19; 204/159.24; 260/17 A; 260/28.5 R; 260/42.52; 260/42.53; 427/54; 428/515
[58] Field of Search ....................... 204/159.23, 159.24, 204/159.18, 159.19, 159.14; 427/54

[56] References Cited

U.S. PATENT DOCUMENTS

| | | | |
|---|---|---|---|
| 3,759,807 | 9/1973 | Osborn et al. | 204/159.23 |
| 3,759,808 | 9/1973 | Parker et al. | 204/159.23 |
| 3,840,448 | 10/1974 | Osborn et al. | 204/159.14 |
| 3,850,675 | 11/1974 | Miller | 204/159.23 |

*Primary Examiner*—Richard B. Turer
*Attorney, Agent, or Firm*—George D. Morris

[57] ABSTRACT

The flatting obtained when films of oxygen inhibitable ultraviolet light coating compositions containing flatting pigment are exposed to ultraviolet light, first in an oxygen containing atmosphere and then in a substantially oxygen free atmosphere, is improved by the presence in the coating composition of an air cure promoter such as benzophenone.

9 Claims, No Drawings

PROCESS FOR PRODUCING FILMS OF LOW GLOSS BY EXPOSURE TO ULTRAVIOLET LIGHT

The present invention is an improvement to the method of producing cured coatings of low gloss disclosed in application Ser. No. 179,564, filed Sept. 10, 1971, now U.S. Pat. No. 3,918,393, issued Nov. 11, 1975.

That application described exposing an oxygen inhibitable ultraviolet light curable coating composition containing a photoinitiator, an oxygen inhibitable resin having acrylic unsaturation and a flatting pigment to ultraviolet light in an atmosphere containing a low gloss imparting amount of oxygen to gel the surface of the coating and to cure the interior of the coating to a greater degree of cure than the surface. The amount of oxygen in this curing atmosphere is usually at least about 5000 parts of oxygen or more per million parts of atmosphere, by volume. Thereafter, the exposed coating is further exposed to ultraviolet light in an atmosphere wherein any oxygen present is insufficient to significantly inhibit free radical curing of the gelled surface, whereby the coating is cured into a hard, mar and abrasion resistant film having a surface of low gloss. Usually this curing atmosphere contains less than about 1000 parts oxygen per million parts of atmosphere by volume. For brevity, the first exposure to ultraviolet light is termed the first stage and the second exposure is termed the second stage.

Although it is not desired to be bound by any theory, it is believed that in the first stage, the polymerization of the surface of the coating is inhibited by the oxygen present in the curing atmosphere and remains wet. The underneath portion of the coating which is not inhibited by surface oxygen is cured through free radical polymerization to a reasonably hard polymer. During this first stage cure, several things appear to occur. First, the underneath portion of the coating shrinks in going from low molecular weight to high molecular weight and during this shrinkage, it is believed that a small amount of pigment is forced into the wet surface layer thereby increasing the pigment to binder ratio in the surface layer. Second, the surface layer, which remains wet to the touch, has been somewhat polymerized and is now approximately the consistency of soft butter. Although it is soft and can be easily wiped off with the finger or a cloth, it does have sufficient rheological properties to support pigment. Third, there appears to be a microevaporation of resin at the surface of the coating which causes pigment to be exposed. Even though exposed, the pigment remains coated with a very thin layer of resin. Ordinarily, when inert volatile solvents are absent from the coating composition, the amount of loss is less than 0.5 percent by weight. The net effect of these occurrences appear to be that the pigment to binder ratio in the thin surface layer is significantly increased thereby reducing the gloss. While the surface remains wet after the first stage, it does have a low gloss which will be maintained during the second stage where the surface layer is substantially fully cured. The underneath layer, if not previously fully cured in the first stage, is also substantially fully cured in the second stage. Properties such as stain resistance, solvent resistance and abrasion resistance are essentially identical between a coating formulation cured by the above two-stage process and one that is fully cured by a single exposure in a nitrogen atmosphere, thus indicating that the two-stage process does not adversely affect the properties or the composition of the polymer that is formed.

It is often desirable to achieve as low a gloss as is reasonably possible without adversely affecting the rheological properties of the coating composition. One way to lower gloss is to load the coating composition with inordinate amounts of flatting pigment, but this causes the viscosity of the coating composition to become unacceptably high. Application of such high viscosity compositions is difficult.

It has now been found that gloss may be reduced while maintaining reasonable viscosities if the coating compositions contains a gloss reducing amount of air cure promoter.

Although it is not desired to be bound by any theory, it is believed that the improved gloss reduction is obtained by somewhat reducing the thickness of the wet surface layer. By adding an air cure promoter in the proper amount, the thickness of the wet surface layer can be reduced to produce a surface of reduced gloss. If too little air cure promoter is used, the thickness of the wet surface layer leaving the first stage will be too large and significant gloss reduction will not occur. If too much air cure promoter is used, there will be too little oxygen inhibition to provide flat films. Indeed, if the air cure promoter is added in such large amounts that oxygen inhibition is for practical purposes eliminated, the process will be equivalent to a single exposure to ultraviolet light in an inert atmosphere such as a nitrogen atmosphere and films of high gloss will result.

The amount of air cure promoter used is highly variable and depends upon the specific identities of the air cure promoter and the oxygen inhibitable ultraviolet light curable acrylic resin used. An amount is used which will impart to the cured film a lower gloss than if the air cure promoter were absent. The precise amounts may be determined by simply admixing varying known proportions of air cure promoter with the other components of the coating composition, coating a substrate, exposing the substrate to ultraviolet light in both the first and second stages and measuring the gloss. A coating composition containing no air cure promoter is used as a control. Most often the useful amount of air cure promoter is in the range of from about 0.1 percent to about 10 percent by weight of the binder of the coating composition. Typically, the amount is in the range of from about 0.3 percent to about 5 percent. Most often the amount is in the range of from about 0.5 to about 3 percent by weight of the binder. This is not to say that all values within these ranges, particularly the higher values, will necessarily represent amounts of air cure promoter which will produce reduced gloss for all air cure promoters and all resins. They do, however, represent useful values typically encountered.

Examples of air cure promoters which may be used in the present invention are:
anthraquinone
thioxanthone
2-benzoylpyridine
4-chlorobenzophenone
4-methoxybenzophenone
4-methylbenzophenone
benzophenone
2-chloroanthraquinone
dibenzosuberone
o-benzoylbenzophenone
chlorinated terphenyls
mercaptoacetic acid mercaptoethanol Copolymerizable resins whose polymerization is less inhibited by oxygen than the principal resin may be used as an air cure promoter. Examples of such a resin are the diacrylate of Bisphenol A-diglycidyl ether, the diacrylate of 1,4-butanediol diglycidyl ether, the diacrylate of neopentylglycol diglycidyl ether, the dimethacrylate of Bisphenol A-diglycidyl ether, the dimethacrylate of 1,4-butanediol diglycidyl ether and the dimethacrylate of neopentyl glycol diglycidyl ether.

The preferred air cure promoter is benzophenone. Mixtures of air cure promoters may be used.

Substantially any photoinitiator which will, upon exposure to ultraviolet light, initiate polymerization may be used. Examples of photoinitiators which may be used are benzoin
methyl benzoin ether
ethyl benzoin ether
isopropyl benzoin ether
butyl benzoin ether
isobutyl benzoin ether
benzoin acetate
benzoin phenyl carbamate
$\alpha,\alpha$-diethoxyacetophenone
$\alpha,\alpha$-diethoxy-$\alpha$-phenylacetophenone
$\alpha,\alpha$-dimethoxy-$\alpha$-phenylacetophenone
4,4'-dicarboethoxybenzoin ethyl ether
$\alpha$-chloroacetophenone
$\alpha$-bromoacetophenone
benzoin phenyl ether
$\alpha$-methylbenzoin ethyl ether
benzoin acrylate
$\alpha$-methylolbenzoin methyl ether
$\alpha,\alpha,\alpha$-trichloroacetophenone
o-bromoacetophenone
4-(benzoylphenylmethoxycarbonylimino)-2-(acrylyloxyethoxycarbonylimino)-1-methylbenzene
cumene hydroperoxide
benzoyl peroxide
dicumyl peroxide
tert-butyl perbenzoate
$\alpha,\alpha$-azobisisobutyronitrile
phenyl disulfide
chloromethylbenzanthrone
chloromethylanthraquinone
chloromethylnaphthalene
bromomethylbenzanthrone
bromomethylanthraquinone
bromomethylnaphthalene The preferred photoinitiators are isobutyl benzoin ether and mixtures of butyl isomers of butyl benzoin ether. Mixtures of photoinitiators may be used.

The amount of photoinitiator present in the coating composition may also be widely varied. Ordinarily the photoinitiator is present in an amount in the range of from about 0.01 percent to about 10 percent by weight based on the weight of the binder of the coating composition. Most often, an amount in the range of from about 0.05 percent to about 7 percent is used. From about 0.1 percent to about 5 percent by weight based on the weight of the binder is preferred.

Useful oxygen resins having acrylic unsaturation and capable of being free radically addition polymerized may be oxygen inhibitable polymers having acrylic unsaturation in sidechains attached to the molecular backbone of the polymer or they may be oxygen inhibitable oligomers having a plurality of acrylic groups.

Oxygen inhibitable polymers having acrylic unsaturation in sidechains attached to the molecular backbone are usually prepared by including one or more monomers which, when interpolymerized with other monomers, to form the polymer, provides reactive sites attached to the polymer along the backbone. Acrylically unsaturated compounds having at least one functional group which will react with the reactive sites on the polymeric backbone are then used to introduce the acrylic unsaturation into the molecule. The usual reactive sites attached directly or indirectly to the polymer are hydroxy, amino, carboxy, carbamyl, isocyanato or epoxy. Hydroxy or carboxy are most often used. When the reactive sites are hydroxy, the acrylically unsaturated compound usually has carboxy, haloformyl (most often chloroformyl) or isocyanato functionality. When the reactive sites on the polymer are amino, the acrylically unsaturated compound usually has isocyanato, haloformyl (again, most often chloroformyl) or epoxy functionality. When the reactive sites on the polymer are carboxy, the acrylically unsaturated compound generally has hydroxy, epoxy or isocyanato functionality. When the reactive sites are carbamyl, they are usually reacted with formaldehyde to produce N-methylol carbamyl groups. When the reactive sites are isocyanato, the acrylically unsaturated compound ordinarily contains hydroxy or carboxy functionality. When the reactive sites are epoxy (usually glycidyl), the acrylically unsaturated compound generally has carboxy functionality. The acrylically unsaturated compound ordinarily contains carboxy, haloformyl or isocyanato functionality.

The polymer having reactive sites attached thereto can itself be of many types, as for example, polyacrylates, polyamides, polyesters or polyurethanes.

The term polyacrylate is used in its broadest sense to include not only polymerized unsubstituted acrylates, but also polymerized $\alpha$-substituted acrylates, such as methacrylates, ethacrylates and $\alpha$-chloroacrylates. Compounds from any of these subclasses may be used alone, but most often, compounds from two or more subclasses are interpolymerized.

Examples of suitable monomers which may be used in the preparation of the polyacrylate polymer include methyl acrylate, ethyl acrylate, propyl acrylate, isopropyl acrylate, butyl acrylate, isobutyl acrylate, sec-butyl acrylate, tert-butyl acrylate, amyl acrylate, hexyl acrylate, heptyl acrylate, octyl acrylate, 2-ethylhexyl acrylate, decyl acrylate, dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, hexyl methacrylate, heptyl methacrylate, octyl methacrylate, 2-ethylhexyl methacrylate, decyl methacrylate, dodecyl methacrylate methyl $\alpha$-chloroacrylate, ethyl $\alpha$-chloroacrylate, propyl $\alpha$-chloroacrylate, hexyl $\alpha$-chloroacrylate, octyl $\alpha$-chloroacrylate, decyl $\alpha$-chloroacrylate and dodecyl $\alpha$-chloroacrylate. Esters of unsubstituted acrylic acid and methacrylic acid are most often used.

Acrylic monomers which introduce reactive sites to the polymer molecule are acrylic acid, 2-hydroxyethyl acrylate, 2-hydroxypropyl acrylate, 3-hydroxypropyl acrylate, glycidyl acrylate, acrylamide, 2-aminoethyl acrylate, methacrylic acid, 2-hydroxyethyl methacrylate, 2-hydroxypropyl methacrylate, 3-hydroxypropyl methacrylate, glycidyl methacrylate, methacrylamide, 2-aminoethyl methacrylate, 3-aminopropyl methacrylate and α-chloroacrylic acid.

Other ethylenically unsaturated monomers are often included. Examples of these compounds are styrene and α-methylstyrene.

The amount of acrylic monomers which are used to introduce reactive sites to the polymer molecule may vary widely, but they are ordinarily present in the range of from about 3 percent to about 50 percent by weight of the ethylenically unsaturated monomers interpolymerized. An amount in the range of from about 4 percent to about 25 percent is most often the case.

Addition polymerization may be effectuated by combining the ethylenically unsaturated monomers with a free radical initiator and heating the mixture. Exemplary free radical initiators are organic peroxides such as ethyl peroxide and benzoyl peroxide; hydroperoxides such as methyl hydroperoxide, acyloins such as benzoin; certain azo compounds such as α,α'-azobisisobutyronitrile and γ,γ'-azobis(γ-cyanovaleric acid); persulfates; peracetates such as methyl peracetate and tert-butyl peracetate; peroxalates such as dimethyl peroxalate and di(tert-butyl) peroxalate; disulfides such as dimethyl thiuram disulfide and ketone peroxides such as methyl ethyl ketone. In lieu of the chemical free radical initiators, high energy ionizing particles irradiation, high energy ionizing electromagnetic radiation or actinic light in conjunction with a photoinitiator may be used as a source of free radicals. High energy ionizing particle radiation includes accelerated electrons; highly accelerated nuclear particles such as proton, neutrons, alpha particles, deuterons and beta particles. High energy ionizing electromagnetic radiation includes X-rays and gamma rays. Actinic light is usually ultraviolet light. The polymerization may be accomplished in the presence or absence of an inert solvent. When chemical initiators are used, temperatures in the range of from about 75° to about 400° F. are generally employed. More often, temperatures in the range of from about 100° to about 300° F. are used.

When the polymer is a polyamide, polyester, or polyurethane, the principles are analogous to those given for the polyacrylates. The known reactions for forming such polymers will, of course, be used instead of the addition polymerization reaction illustrated above for the polyacrylates.

Organic ultraviolet light curable acrylic oligomers, which are oxygen inhibitable and which may be used as the resin in the invention, generally comprise divalent, trivalent or tetravalent organic radicals whose bonds are satisfied with unsubstituted acrylyloxy or α-substituted acrylyloxy groups. The polyvalent radical may be aliphatic, cycloaliphatic or aromatic. Usually, the molecular weight of the oligomer is in the range of from about 170 to about 1000. Examples of such oligomers are the diacrylates and dimethylacrylates of ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, propylene glycol, neopentyl glycol, 5,5-dimethyl-3,7-dioxanonane-1,9-diol, 2,2-dimethyl-3-hydroxypropyl 2,2-dimethyl-3-hydroxypropionate; the triacrylates, trimethacrylates, diacrylates and dimethylacrylates of glycerol, 1,1,1-trimethylolpropane and trimethylolethane; and the tetracrylates, tetramethacrylates, triacrylates, trimethacrylates, diacrylates and dimethacrylates of pentacrythritol and erythritol. The acrylic groups on the oligomer molecules are usually the same, but they may be different as exemplified by the compound 2,2-dimethyl-1-acrylyloxy-3-methacrylyloxypropane.

Other examples of satisfactory oxygen inhibitable acrylic oligomers are acrylic polyester and acrylic polyamide molecules represented by the formulae

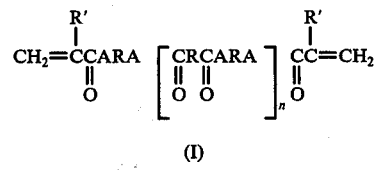

(I)

and

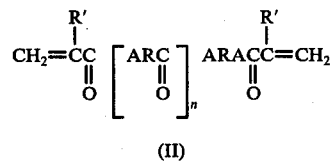

(II)

wherein $n$ is an integer in the range of from 1 to 4;

each R independently represents a divalent aliphatic, cycloaliphatic or aromatic hydrocarbon radical having from 1 to 10 carbon atoms;

each R' independently represents hydro, methyl or ethyl;

and each A independently represents O or NH.

It is preferred that every A represent O. The polyester and polyamide oligomers represented by formula (I) may be prepared by reacting dicarboxylic acids or acid amides and dihydric alcohols or diamines and then reacting the product with an unsubstituted acrylic acid or an α-substituted acrylic acid. The acrylic polyester and polyamide oligomers represented by formula (II) may be prepared by reacting a hydroxyfunctional monocarboxylic acid, a dimer, trimer or a tetramer of such acid, an amino functional monocarboxylic acid or a dimer, trimer or tetramer of such acid with an unsubstituted or α-substituted acrylic acid. Where desired, the lactone may be used in lieu of the hydroxy functional monocarboxylic acid and the lactam may be used in place of the amino functional monocarboxylic acid.

The amount of oxygen inhibitable polymerizable resin having acrylic unsaturation present in the coating composition is subject to wide variation. The oxygen inhibitable resin is ordinarily present in an amount in the range of from about 20 to 100 percent by weight of the binder of the coating composition. An amount in the range of from about 50 to 100 percent is typical. From about 80 to 100 percent by weight of the binder is preferred.

Monomers having monoacrylic functionality which crosslink with the resin having acrylic unsaturation may optionally be present in the coating composition. Examples of monoacrylic functional monomers which may be used are methyl acrylate, methyl methacrylate, ethyl acrylate, ethyl methacrylate, propyl acrylate, propyl methacrylate, butyl acrylate, butyl methacrylate, hexyl acrylate, hexyl methacrylate, octyl acrylate and octyl methacrylate. The preferred monoacrylic functional monomers are liquid compounds miscible with the resin. The use of one or more monoacrylic functional monomers is desirable because the greater mobility of the smaller monomer molecule, as compared to the larger resin molecule, allows crosslinking to proceed faster than if the monoacrylic functional monomer were absent. Another benefit is that the monoacrylic functional monomer usually acts as a reactive solvent for the resin thereby providing coating compositions having a satisfactory low viscosity without using an inordinate amount, if any at all, of volatile, nonreactive solvent.

The monoacrylic functional monomer, or mixtures of monoacrylic functional monomers, may be employed over a broad range. At the lower end of the range, no monoacrylic functional monomer need be used. The amount of monomer when used should be sufficient to provide a liquid, flowable, interpolymerizable mixture. Ordinarily the monomer will be present in the coating composition in the range of from about 0 to about 80 percent by weight of the binder of the coating composition. When used, the monoacrylic functional monomer will ordinarily be in the range of from about 15 to about 30 percent by weight of the binder.

Flatting pigments which are generally transparent to ultraviolet light are included in the coating composition. Examples of suitable flatting pigments are finely divided particles of silica, barytes, calcium carbonate, talc, magnesium silicate, aluminum silicate, etc. Flatting pigment is generally present in an amount in the range of from about 2 to about 70 percent by weight of the coating composition. An amount in the range of from about 3 to about 50 percent is more often employed. It is usually present in the range of from about 5 to about 35 percent by weight of the coating composition. Although a single flatting pigment is ordinarily used, mixtures of several flatting pigments are satisfactory.

Ultraviolet light absorbing pigments may optionally be used in amounts which do not preclude curing of the interior of the coating. The maximum amount is therefore related to the thickness of the coating to be cured. Thin coatings may tolerate more ultraviolet light absorbing pigment than thick coatings. Amounts in the range of from about 0 percent to about 50 percent by weight based on the weight of the binder may be used. For thicker coatings, from about 0 percent to about 25 percent are satisfactory. Examples of suitable ultraviolet light absorbing pigments are titanium dioxide, antimony oxide, zinc oxide, zirconium oxide, zinc sulfide and lithopone. Mixtures of pigments may be used.

An optical ingredient which may be included in the coating composition is an inert volatile organic solvent. Mixtures of several inert volatile organic solvents may be used when desired. Examples of suitable inert volatile organic solvents are acetone, metyl ethyl ketone, mehtyl isobutyl ketone, methyl alcohol, ethyl alcohol, propyl alcohol, isopropyl alcohol, butyl alcohol, sec-butyl alcohol, isobutyl alcohol, tert-butyl alcohol, amyl alcohol, hexyl alcohol, 2-ethylhexyl alcohol, cellosolve, ethyl cellosolve, cellosolve acetate, 2-ethylhexyl acetate, tetrahydrofuran, and aliphatic naphtha. Solvent of this type is ordinarily present in the coating composition in the range of from about 0 to about 40 percent by weight of the vehicle of the coating composition. From about 0 to about 15 percent is typical. When inert volatile organic solvent is used, it is usually present in the range of from about 1 to about 15 percent by weight of the vehicle.

The coating compositions of the invention are usually prepared by simply admixing the various ingredients. The compounds comprising the photocatalyst system may be premixed and then admixed with the other ingredients of the coacting composition or they may be added separately. Although mixing is usually accomplished at room temperature, elevated temperatures are sometimes used. The maximum temperature which is usable depends upon the heat stability of the ingredient. Temperatures above about 200° C. are only rarely employed.

The ultraviolet light curable coating compositions of the invention are generally used to form cured adherent coatings on substrates. The substrate is coated with the coating composition using substantially any technique known to the art. These include spraying, curtain coating, dipping, roller application, pointing, brushing, drawing and extrusion.

Cured coatings of the ultraviolet light curable coating composition of the invention usually have thicknesses in the range of from about 0.1 to about 100 mils. More often they have thicknesses in the range of from about 0.3 to about 10 mils.

Any suitable source which emits ultraviolet light, viz., electromagnetic radiation having a wavelength in the range of from about 1800 to about 4000 Angstrom units, may be used in the practice of this invention. Suitable sources are mercury arcs, carbon arcs, low pressure mercury lamps, medium pressure mercury lamps, high pressure mercury lamps, swirl-flow plasma arc, ultraviolet light emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end. Examples of these lamps are PPG Models 60-2032, 60-0393, 60-0197 and 60-2031 and Hanovia Models 6512A431, 6542A431, 6565A431 and 6577A431.

The times of exposure to ultraviolet light and the intensity of the ultraviolet light to which the coating composition is exposed may vary greatly. Generally the exposure to ultraviolet light should continue in the first stage until the surface is gelled and flatted. The exposure to ultraviolet light in the second stage should continue until the C-stage is reached for the entire film, when hard, mar and abrasion resistant films of low gloss result.

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys.

In the illustrative examples which follow, all parts are parts by weight and percentages are percent by weight unless otherwise specified.

EXAMPLE I

The preparation of 3-acrylyloxy-2,2-dimethylpropyl 3-acrylyloxy-2,2-dimethylpropionate is described in Example 1 of U.S. Pat. No. 3,645,984. This resin is oxygen inhibitable and ultraviolet light curable.

Neopentyl glycol diacrylate is prepared by reacting 1150 parts neopentyl glycol and 1830 parts acrylic acid in the presence of 66.5 parts hydroquinone, 165 parts p-toluene sulfonic acid, 385 parts cyclohexane and 5.2 parts p-methoxyphenol. The solvent is removed by distillation leaving a neopentyl glycol diacrylate composition having a solids content of 99+ percent, a Gardner-Holdt viscosity of A- and an acid number of about 1. This resin is also oxygen inhibitable and ultraviolet light curable.

A base composition is prepared by admixing 483 parts 3-acrylyloxy-2,2-dimethylpropyl 3-acrylyloxy-2,2-dimethylpropionate, 322 parts neopentyl glycol diacrylate, 150 parts silica flatting pigment, 45 parts 0.2 second viscosity grade cellulose acetate butyrate and 12.7 parts isobutyl benzoin ether. Six coating compositions are prepared by admixing six 101.27 part portions of base composition with 0.5, 1.0, 1.5, 2.0, 2.5 and 3.0 parts of benzophenone, respectively. A portion of the base composition containing no benzophenone is set aside as a seventh coating composition.

Each of the coating compositions is coated onto a separate dark woodgrain vinyl film substrate and passed once in air at 100 feet per minute beneath two 200 watts per inch ultraviolet light emitting mercury vapor bulbs. The bulb to substrate spacing is 5¼ inches. The coated substrates are then passed once in a nitrogen atmosphere containing less than 1000 parts of oxygen per million parts atmosphere, at 50 feet per minute under one 330 watts per inch ultraviolet light emitting bulb. The bulb to substrate spacing is one inch. The gloss of the resulting hard films is measured using a Gardner glossmeter using the method described in ASTM 0523-67. The results are shown in Table 1.

Table 1

| Benzophenone added, parts | 60° Gloss, percent specular surface reflectance |
|---|---|
| 0 | 25 |
| 0.5 | 10 |
| 1.0 | 6,9 |
| 1.5 | 12 |
| 2.0 | 14 |
| 2.5 | 19 |
| 3.0 | 28,33 |

EXAMPLE II

The procedure of Example I is repeated, except that two coating compositions are prepared by admixing 101.27 part portions of base composition of Example I with 1.0 and 3.0 parts of mercaptoacetic acid, respectively. Exposure of the coatings to ultraviolet light in both stages of the curing process according to the procedure of Example I produces hard films. The results are shown in Table 2.

Table 2

| Mercaptoacetic acid added, parts | 60° Gloss, percent specular surface reflectance |
|---|---|
| 0 | 25 |
| 1.0 | 15 |
| 3.0 | 9 |

EXAMPLE III

A paste is prepared by grinding together 150 parts Syloid 385 silica pigment, 483 parts 3-acrylyloxy-2,2-dimethylpropyl 3-acrylyloxy-2,2-dimethylpropyl 3-acrylyloxy-2,2-dimethylpropionate and 45 parts 0.2 second viscosity grade cellulose acetate butyrate. A base composition is prepared by admixing 678 parts of the above paste, 320 parts 3-acrylyloxy-2,2-dimethylpropyl 3-acrylyloxy-2,2-dimethylpropionate and 12.7 parts isobutyl benzoin ether. Five coating compositions are prepared by admixing five 100 part portions of the above base composition with 1.0, 1.5, 2.0, 3.0 and 4.0 parts of benzophenone, respectively. A portion of the base composition containing no benzophenone is set aside as a sixth coating composition.

Each of the coating compositions is coated onto a separate black vinyl film substrate and exposed to ultraviolet light in both stages of the curing process according to the procedure of Example I to produce hard films. Gloss is measured in the manner of Example I. The results are shown in Table 3.

Table 3

| Benzophenone added, parts | 60° Gloss, percent specular surface reflectance |
|---|---|
| 0 | 25 |
| 1.0 | 13 |
| 1.5 | 7 |
| 2.0 | 12 |
| 3.0 | 16 |
| 4.0 | 24 |

EXAMPLE IV

A paste is prepared by grinding together 467 parts 3-acrylyloxy-2,2-dimethylpropyl 3-acrylyloxy-2,2-dimethylpropionate, 86 parts neopentyl glycol diacrylate, 44 parts 0.2 second viscosity grade cellulose acetate butyrate, 145 parts Syloid 385 silica pigment and 10 parts microcrystalline wax to a 5.5 Hegman grind. A base composition is prepared by admixing 752 parts of the above paste, 226 parts neopentyl glycol diacrylate and 12 parts isobutyl benzoin ether. Six coating compositions are prepared by admixing six 100 gram portions of the above base composition with 0.05, 0.15, 0.3, 0.5, 0.75 and 1.0 parts of dibenzosuberone, respectively.

Each of the coating compositions is coated onto a separate substrate and exposed to ultraviolet light in both stages of the curing process according to the procedure of Example I to produce hard films. Gloss is measured in the manner of Example I. The results are shown in Table 4.

Table 4

| Dibenzosuberone added, parts | 60° Gloss, percent specular surface reflectance | 85° Gloss, percent specular surface reflectance |
|---|---|---|
| 0.05 | 22 | 58 |
| 0.15 | 20 | 55 |
| 0.3 | 18 | 52 |
| 0.5 | 14 | 47 |
| 0.75 | 11 | 41 |
| 1.0 | 18 | — |

I claim:

1. In the method wherein a coating of an oxygen inhibitable ultraviolet light curable coating composition containing a photoinitiator selected from the group consisting of benzoin, methyl benzoin ether, ethyl benzoin ether, isopropyl benzoin ether, butyl benzoin ether, isobutyl benzoin ether, benzoin acetate, benzoin phenyl carbamate, α,α-diethoxyacetophenone, α,α-diethoxy-α-phenylacetophenone, α,α-dimethoxy-α- phenylacetophenone, 4,4'-dicarboethoxybenzoin ethyl ether, α-chloroacetophenone, α-bromoacetophenone, benzoin phenyl ether, α-methylbenzoin ethyl ether, benzoin acrylate, α-methylolbenzoin methyl ether, αλ,α,α-trichloroacetophenone, o-bromoacetophenone, 4-(benzoylphenylmethoxycarbonylimino)-2-(acrylyloxyethoxycarbonylimino)-1-methylbenzene, cumene hydroperoxide, benzoyl peroxide, dicumyl peroxide, tert-butyl perbenzoate, α,α'-azobisisibotyronitrile, phenyl disulfide, chloromethylbenzanthrone, chloromethylanthraquinone, chloromethylnaphthalene, bromomethylbenzanthrone, bromomethylanthraquinone and bromomethylnaphthalene, an oxygen inhibitable resin having acrylic unsaturation and a flatting pigment which is generally transparent to ultraviolet light is exposed to ultraviolet light in an atmosphere containing a low gloss imparting amount of oxygen to gel the surface of said coating and to cure the interior of said coating to a greater degree of cure than said surface and thereafter said exposed coating is exposed to ultraviolet light in an atmosphere wherein any oxygen present is insufficient to significantly inhibit free radical curing of said gelled surface, whereby said coating is cured into a hard, mar and abrasion resistant film having a surface of low gloss, the improvement wherein said coating composition contains an air cure promoter selected from the group consisting of anthraquinone, thioxanthone, 4-chlorobenzophenone, 4-methoxybenzophenone, benzophenone, 2-chloroanthraquinone, dibenzosuberone, o-benzoylbenzophenone, chlorinated terphenyls, mercaptoacetic acid and mercaptoethanol in an amount which will impart to said cured film a lower gloss than if said air cure promoter were absent.

2. The method of claim 1 wherein said air cure promoter is present in said coating composition in an amount in the range of from about 0.1 percent to about 10 percent by weight of the binder of said coating composition.

3. The method of claim 1 wherein said air cure promoter is benzophenone.

4. The method of claim 1 wherein the air cure promoter is dibenzosuberone.

5. The method of claim 1 wherein said oxygen inhibitable resin is 3-acrylyloxy-2,2-dimethylpropyl 3-acrylyloxy-2,2-dimethyl-propionate.

6. The method of claim 1 wherein said oxygen inhibitable resin is a mixture of 3-acrylyloxy-2,2-dimethylpropyl 3-acrylyloxy-2,2-dimethylpropionate and neopentyl glycol diacrylate.

7. In the method wherein a coating of an oxygen inhibitable ultraviolet light curable coating composition containing a photoinitiator selected from the group consisting of isobutyl benzoin ether and mixtures of butyl isomers of butyl benzoin ether, an oxygen inhibitable resin having acrylic unsaturation and silica flatting pigment is exposed to ultraviolet light in an atmosphere containing a low gloss imparting amount of oxygen to gel the surface of said coating and to cure the interior of said coating to a greater degree of cure than said surface and thereafter said exposed coating is exposed to ultraviolet light in an atmosphere wherein any oxygen present in insufficient to significantly inhibit free radical curing of said gelled surface, whereby said coating is cured into a hard, mar and abrasion resistant film having a surface of low gloss, the improvement wherein said coating composition contains an air cure promoter selected from the group consisting of benzophenone, mercaptoacetic acid and dibenzosuberone in an amount which will impart to said cured film a lower gloss than if said air cure promoter were absent.

8. The method of claim 7 wherein said air cure promoter is present in said coating composition in an amount in the range of from about 0.1 percent to about 10 percent by weight of the binder of said coating composition.

9. The method of claim 7 wherein said air cure promoter is benzphenone.

* * * * *